United States Patent [19]

Lynn

[11] Patent Number: 5,221,617
[45] Date of Patent: Jun. 22, 1993

[54] PROCESS FOR PRODUCING FERMENTATION PRODUCTS

[75] Inventor: Charles C. Lynn, North Ridgeville, Ohio

[73] Assignee: Superior Fermitech Liquidating Trust, North Ridgeville, Ohio

[21] Appl. No.: 872,934

[22] Filed: Apr. 22, 1992

Related U.S. Application Data

[62] Division of Ser. No. 300,270, Jan. 23, 1989, Pat. No. 5,185,165.

[51] Int. Cl.$^5$ .............................................. A21D 2/08
[52] U.S. Cl. .................................. 435/23; 514/53; 426/61; 426/18; 426/549; 435/101; 435/287
[58] Field of Search ................. 435/101, 287; 426/61, 426/18, 549; 514/23, 53

[56] References Cited

U.S. PATENT DOCUMENTS 3,404,984   5/1977   Olsen ................................. 435/101

Primary Examiner—Ronald W. Griffin
Assistant Examiner—Pamela S. Webber
Attorney, Agent, or Firm—Pillsbury, Madison & Sutro

[57] ABSTRACT

A precursor base for use in a bakery dough product comprising an acidic concentrate, at least one type of sugar, yeast, at least one type of flour, non-fat dry milk and at least one type of lactic acid producing bacteria and a process for producing the precursor base are disclosed. The presursor base is useful in a process for producing a precursor slurry (or active ferment concentrate) for use in making a preferment dough mixture for the preparation of the bakery dough product. In addition, processes for preparing the precursor slurry and the preferment dough mixture and an apparatus for producing the preferment dough mixture are disclosed.

73 Claims, 2 Drawing Sheets

PROCESS FOR PRODUCING FERMENTATION PRODUCTS

This is a divisional of copending application Ser. No. 07/300,270 filed on Jan. 23, 1989, now U.S. Pat. No. 5,185,165.

BACKGROUND OF THE INVENTION

This invention is directed to a new fermentation system that drastically reduces the fermentation time and equipment size necessary to produce bakery products without corresponding reductions in the quality of the bakery products.

The bakery industry has been faced with the problems of rapidly increasing manufacturing costs associated with the steadily rising costs of labor, energy, raw materials, real estate and other such factors. To combat these increasing costs, the bakery industry began to look for increased productivity. The bakery industry, in its yeast-raised product segment, found that a logical place to decrease manufacturing costs was in the most time-consuming element, namely the required fermentation time of the bakery product. Various methods were developed to speed-up fermentation by means of various chemical and physical inducements. In the early stages of such developements, the industry found no apparent problems associated with the reduction of fermentation time. However, as the trend to cut required fermentation time continued, the industry has continued to face increasing new problems, including adverse and undesirable effects on the quality of the bakery products. Bread, rolls, buns and other bakery products started having decreasing amounts of flavor and aroma along with the gradual loss of other such desirable characteristics as texture, aesthetic appeal and good shelf life.

One widely accepted method to produce high-quality products is the "sponge and dough", or batch process method which results in the high-quality products with good flavor, aroma, desirable texture, and good shelf life. However, the sponge and dough method is also the most costly method due to the requirements of double mixing, approximately four hours fermentation time, and extra handling, all of which require much labor, space, energy, and time. The sponge and dough method is also intolerant of disruptions in the production process of even short durations thus resulting in higher waste if the process is interrupted.

Other methods of production include the flour preferment method, which normally contains up to about 50% of the total flour and which produces good quality products. However, there is some sacrifice of desirable end-product characteristics when compared to the sponge and dough method. The flour preferment method, due to the high flour content, requires heavy-duty equipment, large pumps to handle the viscosity of the high flour content preferment product, and high energy consumption for cooling. In addition, frequent maintenance problems occur in the heat exchange and process flow equipment used in the flour preferment method.

Another production method, the water preferment method, contains no flour, yet offers good yeast distribution. However, the water preferment method requires considerable amounts of water and sugar and produces below average quality bakery goods. In addition, such method is very sensitive at the yeast saturation point and therefore requires intensive monitoring during the preferment process in order to maintain bakery product consistency.

Still another method, the no-time dough method is very simple and requires no preferment. However, the no-time dough method produces lower quality goods that sacrifice flavor, aroma and shelf life keeping qualities in exchange for the lower production costs associated with the no-time dough method.

Finally, the continuous mixing method is convenient and cost efficient for the baking industry. However, the continuous mixing method produces the least desirable quality bakery products in terms of flavor, aroma texture and keeping qualities.

Previously, it was believed that the function of fermentation was merely related to the gas production in the dough, which would cause the dough to rise and expand. However, extensive investigation into the function of fermentation has established that several relevant processes occur during fermentation. Along with the gas production, there is the production of chemically identifiable substances such as organic acids, ketones and aldehydes which are end-products of the fermentation process itself. The bakery industry has learned that the only function effectively speeded up in a hastened fermentation is the gas production. The other relevant processes and substances have little or no time to be produced during a fast fermentation system. As such, those processes and substances are either missing or undesirably low in such doughs. These substances have been found to give flavor and aroma to the product and also cause the various chemical and physical interactions required for a good yeast raised system. Therefore, any compromise in the fermentation system will result, in various degrees, in a sacrifice of flavor, aroma, texture and other desirable characteristics. The bakery industry and the flavor companies and other food ingredient companies began developing compensating materials to replace the sacrificed characteristics, some through flavor chemistry, others through enzyme related materials. A few of these compensating materials have helped to partially overcome the blandness of these fast fermentation bakery products, but none of the compensating materials has really created or replaced the genuine flavor and other qualities that result from a good fermentation system. Therefore, the current remedies or compensating materials have not offered much improvement and the baking industry is still addressing the quality deterioration problem associated with shorter fermentation systems and the resultant dropping per capita consumption of bakery products.

SUMMARY OF THE INVENTION

The present invention provides a technology which offers a significant breakthrough in solving the problems associated with short fermentation. The present invention greatly improves upon the pre-ferment methods described above. The present invention provides the necessary elements that enable the baker in the bakery industry to produce, through a fast fermentation method, end bakery products that display all of the desirable characteristics normally achievable only through the long fermentation methods.

The present invention provides, in particular, an active ferment concentrate comprising yeast, water and a novel precursor base. The precursor base comprises an acidic concentrate, at least one type of sugar, yeast, at least one type of flour, non-fat dry milk, and at least one type of lactic acid producing bacteria. The precursor base is prepared by combining the acidic concentrate with a portion of the total sugar to be used in making the precursor base to form a liquid composition or slurry. In a separate step the lactic acid producing bacteria is diluted with a small amount of flour. In yet another separate step, the other ingredients, that is, the remaining portions of flour and sugar, the non-fat dry milk, the flour-bacteria dilute and the yeast are combined and thoroughly blended together. During this blending step the liquid composition or slurry is added to the combined ingredients. In a preferred embodiment, the ingredients of the precursor base are present in the following ranges, by weight percent of the total precursor base: acidic concentrate 1.2–2.0 wt. percent; sugar 5.0–20.0 wt. percent; yeast 0.5–1.5 wt. percent; flour 65.0–85.0 wt. percent; non-fat dry milk 4.0–8.0 wt. percent; and lactic acid producing bacteria approximately $5^5$–$15^5$ organisms/grams.

The present invention also provides a practical, efficient universal fermentation system suitable for use in all yeast raised products of bakery operations. The present invention provides a simplified system that can replace any other prefermentation system or combination of systems. By changing the proportions of the bakery product ingredients, along with minor procedural changes, the baker can better control the end results to produce bakery products in a wide range of quality. Time requirements of the present invention are about one-fourth as long as current state-of-the-art systems. The fermentation times required by the flour preferment method are approximately 2 to 2½ hours. In addition, current state-of-the-art flour preferment systems, which achieve good bakery product results, require that approximately 50% of the total flour to be used during the bakery process be added during the prefermenting process. By comparison, the present invention reaches optimal performance while using approximately 15% of the total flour necessary to produce the bakery product and the fermentation time is approximately ½ hour.

The present invention also provides a simpler and smaller preferment system requiring equipment about seven times smaller than normally used in the state-of-the-art fermentation systems. The reduction equipment in size and time requirements result in a much smaller fermentation system which produces the same quantity of finished bakery products. This results in significant energy and labor savings. The preferment mixture handled during the fermentation process of the present invention has a relatively low viscosity, thus requiring equipment which is lighter and simpler in design. The present invention eliminates the double mixing step required by the sponge method, reduces the container number and size requirements present in conventional brewing system processes, and thereby reduces the amount of floor space required. The present invention eliminates the need for multiple transfers of the prefermentation product which is typically required by most conventional prefermentation systems. In addition, the shorter time and greater tolerances of the preferment mixture of the present invention results a system requiring smaller holding systems than are required by the current state-of-the-art fermentation systems. The bakery product production cycle using the present invention requires no more time than the no-time dough methods, yet the quality of bakery goods produced according to the method of the present invention is not comprimised in any way. Thus, better overall plant utilization is attained.

The present invention further provides increased uniformity, reproducibility, and quality control in the bakery products. The fermentation system is completely automatic and easily controllable. The fermentation system is adaptable to microprocessor or microcomputer controls. After a desired time-temperature relationship has been established in a chosen fermentation system for a particular bakery, the variation in time to reach the desired pH or yeast saturation point is nominal, and the tolerance to variations in pH or yeast saturation is greater than in other, known fermentation systems.

The present invention also provides an apparatus which includes a precursor system containing an agitator means which blends the precursor base, water and yeast. After multiple incubations in the precursor system, a finished precursor slurry or active ferment concentrate is produced. The precursor slurry is pumped to a fermentor system which includes an impeller means which blends the precursor slurry with 15% of flour, water, yeast, yeast nutrients and sugar. The impeller means thoroughly mixes the precursor slurry, water, flour, yeast, yeast nutrients and sugar to form a preferment mixture. The preferment mixture is allowed to ferment. When the fermentation cycle has been completed the preferment mixture can be easily and quickly pumped through a heat exchanger where heat is transferred from the preferment mixture so that the preferment mixture achieves the desired temperature. In addition, the preferment mixture can be passed from the heat exchanger into a holding tank system prior to use in preparing the bakery product dough.

The fermentation system of the present invention is simple to use, and with the use of the active ferment concentrate, the system has unusually high tolerances and requires little or no monitoring.

Therefore, it is an object of this invention to provide a good preferment system which is a vital element in making a good yeast-based bakery product. The present invention provides a technology wherein consistent uniform performance is achieved in the production of the end product.

The present invention also provides a compact system utilizing only approximately about 15% of the average flour used in a new system. The present invention requires low capital investment, is very energy efficient, and has low maintenance requirements.

Further, it is an object of this invention to provide a prefermentation system which is easy to introduce into the commercial bakery and is convenient to operate.

It is a further object of this invention to provide a prefermentation system which has high versatility in terms of adjustments to meet the desired end product and which is of utmost universality for all types of production.

It is a further object of this invention to provide a prefermentation system which is extremely economical and which provides savings in cost to the finished bakery product.

Other advantages and features of the invention will be apparent from the following description and drawings relating the preferred embodiments.

DESCRIPTION OF THE PREFERRED EMBODIMENT

Figure 1:
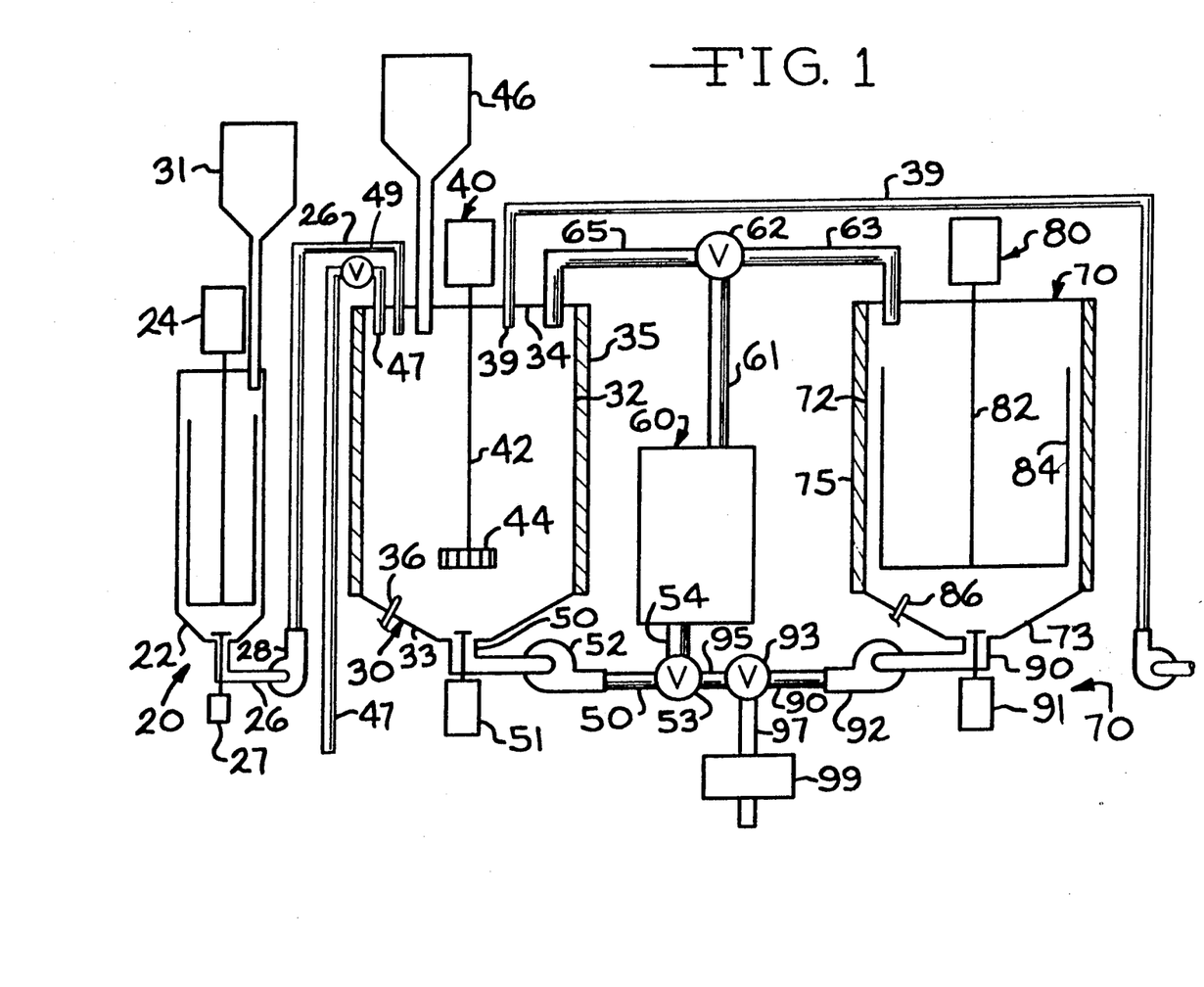
FIG. 1 is a diagrammatic flowchart of one embodiment of the fermentation system of the present invention.

Referring now to FIG. 1, a generalized diagrammatic flowchart is shown, illustrating a fermentation system 10 of the present invention. In this embodiment, and for the purposes of the following description of the preferred embodiment, preferment mixtures for yeast raised doughs are prepared.

The fermentation system 10 generally includes a precursor ingrediator system 20 for preparing a precursor slurry (or active ferment concentrate), a fermentor system 40 for preparing a preferment mixture, optionally, a heat exchanger 60, and, optionally, a holding tank system 70. A control station (not shown) is operatively connected to the ingrediator system 20, the fermentor system 40, the heat exchanger 60 and the holding tank system 70, in a conventional manner and these connections are not shown or described in detail. The control station of the preferred embodiment includes micro processors which control the operations of the fermentation system 10.

In the embodiment shown in FIG. 1, the precursor ingrediator system 20 generally includes an ingrediator tank 22, and a sweep agitator means 24. A portion of the precursor slurry ingredients, namely yeast, a first portion of the water necessary to form the precursor slurry and a first portion of the precursor base necessary to form the precursor slurry are metered or added to the ingrediator tank 22. The precursor base is supplied from a hopper 31 in a conventional manner. The agitator means 24 blends the precursor ingredients together to form a first mixture or portion of the precursor slurry. In a preferred process, the first portion of the precursor slurry comprises approximately one third of the required water and approximately one third of the required precursor base. The first portion of the precursor slurry is allowed to incubate. In a preferred process, the first portion of the precursor slurry is allowed to incubate for approximately 40–45 minutes at a preferred temperature of about 80°–82° F. During this first incubation period, the yeast acts as a catalyst and some fermentation occurs. After the first incubation period is complete, the first portion of the precursor slurry is relatively viscous and the agitator means 24 blends the first portion of the precursor slurry while adding the next, or second portion of the required water to the ingrediator tank 22. In a preferred process, the first portion of the precursor slurry is blended for approximately 1–2 minutes while the water is being added. In a preferred process, the water is sprayed into the ingrediator tank 22, such that the sprayed water acts to clean or wash down the side walls of the ingrediator tank 22. Thereafter, the next, or second, portion of the precursor base is metered or added to the incubated first portion of the precursor slurry and is blended by the agitator means 24 to form a second portion of the precursor slurry, which in a preferred process is blended for approximately 2–3 minutes. In a preferred process, the second portion of the precursor slurry comprises approximately an additional one third of both the water and precursor base. The second portion of the precursor base acts to revitalize the first portion of the precursor slurry. The second portion of the precursor slurry is allowed to incubate. In a preferred process, the second portion of the precursor slurry is allowed to incubate for approximately 40–45 minutes at a preferred temperature of about 80°–82° F. After the second incubation period is complete, the incubated second portion of the precursor slurry is relatively viscous and the agitator means 24 blends the second portion of the precursor slurry while the last, or third, portion of the water is added to the ingrediator tank 22. Again, in a preferred process, the water is sprayed into the ingrediator tank 22 such that the sprayed water acts to clean or wash down the side walls of the ingrediator tank 22. In a preferred process the second portion of the precursor slurry is blended for approximately 1–2 minutes while the water is being added. Thereafter, the last, or third, portion of the precursor base is metered or added to the incubated second portion of the precursor slurry and is blended by the agitator means 124 to form the third or final portion of the precursor slurry, which in a preferred process is blended for another approximately 2–3 minutes. In a preferred process, the third portion of the precursor slurry comprises approximately an additional one third each of the water and precursor base. The last portion of the precursor base also acts to revitalize the final portion of the precursor slurry. The final portion of the precursor slurry is then allowed to further incubate. In a preferred process, the precursor slurry is allowed to incubate for approximately 40–45 minutes at a preferred temperature of about 80°–82° F. After the final incubation period is complete, the resulting precursor slurry, also called the active ferment concentrate herein, has thereby been formed.

The ingrediator system 20 further includes an outlet pipe 26 located proximate the bottom of the ingrediator tank 22. The outlet pipe 26 penetrates the ingrediator tank 22 and is operatively connected to a pneumatic valve 27 and a pump 28 (which are operatively connected to the control station [not shown] in a conventional manner).

After the incubation period of the precursor slurry is complete, additional water is added and the agitator means 24 blends the additional water with the precursor slurry. In a preferred process, the additional water and precursor slurry are blended for approximately 1–2 minutes. The pneumatic value 27 is activated such that the precursor slurry is pumped from the ingrediator tank 22 through the outlet pipe 26 by the pump 28 to the fermentor system 30. The fermentor system 30 generally includes a fermentor tank 32 with a bottom 33, a top 34, and a temperature sensing means 36. The temperature sensing means 36 is operatively connected to the control station (not shown). A jacket 35 is placed around the fermentor tank 32 to control the ambient influence. The fermentor system 30 further includes an impeller means 40 which rotates and aims a shaft 42. An impeller blade 44 is operatively attached to the distal end of the shaft 42 such that when the shaft 42 is rotated about an axis through the shaft 42, the impeller blade 44 is rotated. Flour is supplied to the fermentor tank 32 from a flour hopper 46 in a conventional manner. Water is supplied at a controlled temperature through piping 39 to the fermentor tank 32. The precursor slurry, (which is also called the active ferment concentrate) flour, water, yeast, yeast nutrients and sugar are blended together by rotation of the impeller means 40 to form a mixture, which in a preferred process are blended for approximately 2 minutes. It will be understood that the term "yeast" comprises a commercially available inactive yeast and the term "yeast nutrients" comprises those substances normally employed in the bakery industry to support the growth and activities of the yeast. The amounts and types of yeast and yeast nutrients correspond to the amounts and types normally employed in the bakery industry. This mixture is then allowed to ferment. In the preferred fermentation process the mixture is allowed to ferment for approximately 30 minutes at a preferred temperature of about 81°-82° F. to form a completed brew or preferment mixture. In the preferred embodiment the preferment mixture contains approximately 15% flour, based on the total flour required by the final dough product.

The amounts of the various ingredients used in preparing the preferment slurry can be readily determined by those skilled in the art.

In the embodiment shown in FIG. 1, the fermentor system 30 further includes an outlet pipe 50 located proximate the tank bottom 33. The outlet pipe 50 penetrates the bottom 33. The outlet pipe 50 is operatively connected to a pneumatic valve 51 and a pump 52. The pneumatic valve 51 and pump 52 are operatively connected to the control station (not shown) in a conventional manner. After the preferment mixture has been blended together with additional water, the pneumatic valve 51 is activated such that the preferment mixture is pumped from the fermentor tank 32 through the outlet pipe 50 by the pump 52. The outlet pipe 50 is operatively connected to a three-way valve 53, which is operatively connected to the control station (not shown). The valve 53 directs the flow of the preferment mixture to an inlet pipe 54. The inlet pipe 54 is operatively connected to the heat exchanger 60 where heat is transferred from the preferment mixture.

In one embodiment, the preferment mixture is pumped from the fermentor system 30 through the heat exchanger 60. The preferment mixture is cooled by the heat exchanger 60 to a desired temperature. In a preferred embodiment the preferment mixture is cooled to a temperature of about 40°-45° F. The cooled preferment mixture flows out of the heat exchanger 60 through an outlet pipe 61. The outlet pipe 61 is operatively connected to a three-way valve 62. The valve 62 directs the cooled preferment mixture to an inlet pipe 63. The inlet pipe 63 is operatively connected to the holding tank system 70.

The holding tank system 70 generally includes a holding tank 72 having a bottom 73 and a top 74. A jacket 75 is placed around the holding tank 72 to provide insulation for the cooled preferment mixture. The holding tank system 70 further includes an agitator means 80 to rotate a shaft 82. A slow-sweep agitator 84 is operatively attached to the shaft 82 such that when the shaft 82 is rotated about an axis through the shaft 82, the slow-sweep agitator 84 is rotated. The rotation of the slow-sweep agitator 84 acts to prevent the cooled preferment mixture from separating and prevents the deposit of sediment on the bottom of the holding tank 72.

The holding tank system 70 further includes a temperature sensor 86 to monitor the temperature of the cooled preferment mixture. The temperature sensor 86 is operatively connected to the control station (not shown) in such a manner that if the temperature of the cooled preferment mixture rises about a certain predetermined temperature the preferment mixture is recycled through the heat exchanger 60 until the desired temperature is reached again.

The holding tank system 70 further includes an outlet pipe 90 located proximate the holding tank bottom 73. The outlet pipe 90 penetrates the bottom 73. The outlet pipe 90 is operatively connected to a pneumatic valve 91 and a pump 92, which are operatively connected to the control station (not shown) in a conventional manner. If the preferment mixture is to be cooled again, the pneumatic valve 91 is activated and the preferment mixture is pumped from the holding tank 72 through the outlet pipe 90 by the pump 92. The preferment mixture is pumped through a three-way valve 93 located at the distal end of the outlet pipe 90. The three-way valve 93 is operatively connected to a connecting pipe 95. The connecting pipe 95 is operatively connected to the three-way valve 53 adjacent the heat exchanger 60. The preferment mixture is forced by the pump 92 through the valve 93, the connecting pipe 95 and the valve 53. The valve 53 is automatically adjusted by the control station (not shown) such that the preferment mixture is pumped through the valve 53 through the heat exchanger 60 where the preferment mixture is cooled back to a desired temperature, if it becomes necessary. The three-way valve 62 is automatically adjusted by the control station such that the cooled preferment mixture is forced through the holding tank inlet pipe 63 back into the holding tank 72. The holding tank system 70 can therefore operate in a cyclic manner.

At the appropriate time for preparing the dough for the bakery goods, the holding tank pneumatic valve 91 and the pump 92 are activated by the control station (not shown) and the cooled preferment mixture is pumped from the holding tank 72 through the outlet pipe 90. The three-way valve 93 is also activated such that the preferment mixture is prevented from flowing into the connecting pipe 95. The three-way valve 93 is further connected to a supply pipe 97. The three-way valve 93 is activated such that the preferment mixture is pumped by the pump 92 from the outlet pipe 90 through the three-way valve 93 and into the supply pipe 97. The supply pipe 97 can be operatively connected to a flow meter 99. The flow meter 99 indicates the amount of preferment mixture passing through the supply pipe 97. The supply pipe 97 is operatively connected to a conventional dough mixer (not shown) such that the preferment mixture exits the supply pipe 97 into the mixer. The preferment mixture is then blended with additional flour and other optional ingredients to form the final dough product.

The process of the present invention may alternatively proceed as follows: a first batch or supply of precursor slurry is prepared and incubated in the ingrediator system 20, as described above, and supplied to the fermentor system 30 as an ingredient for the preferment mixture. The preferment mixture is produced in the fermentor system 30 as described above, cooled by the heat exchanger 60 and held in the holding tank system 70. While the first batch is being held in the holding tank system 70, a second batch of precursor slurry is prepared and incubated in the ingrediator system 20 and supplied to the fermentor system 30. After the completion of the prefermentation cycle, as described above, the second batch is cooled by the heat exchanger 60. If the first batch being held in the holding tank 72 has not been depleted, the second batch may be processed through the heat exchanger 60 and supplied to the holding tank 72 on top of the first batch already contained in the holding tank 72. Alternatively, if the holding tank system 70 still contains a large quantity of the first produced batch, the second fermented batch may be cooled by the heat exchanger 60 and passed through the three-way valve 62 and through an outlet pipe 65. The second cooled batch may then be returned to the fermentor tank 32. Thus, the fermentor tank 32 can act as a "holding tank" until the first batch contained in the holding tank 72 is depleted.

Figure 2:
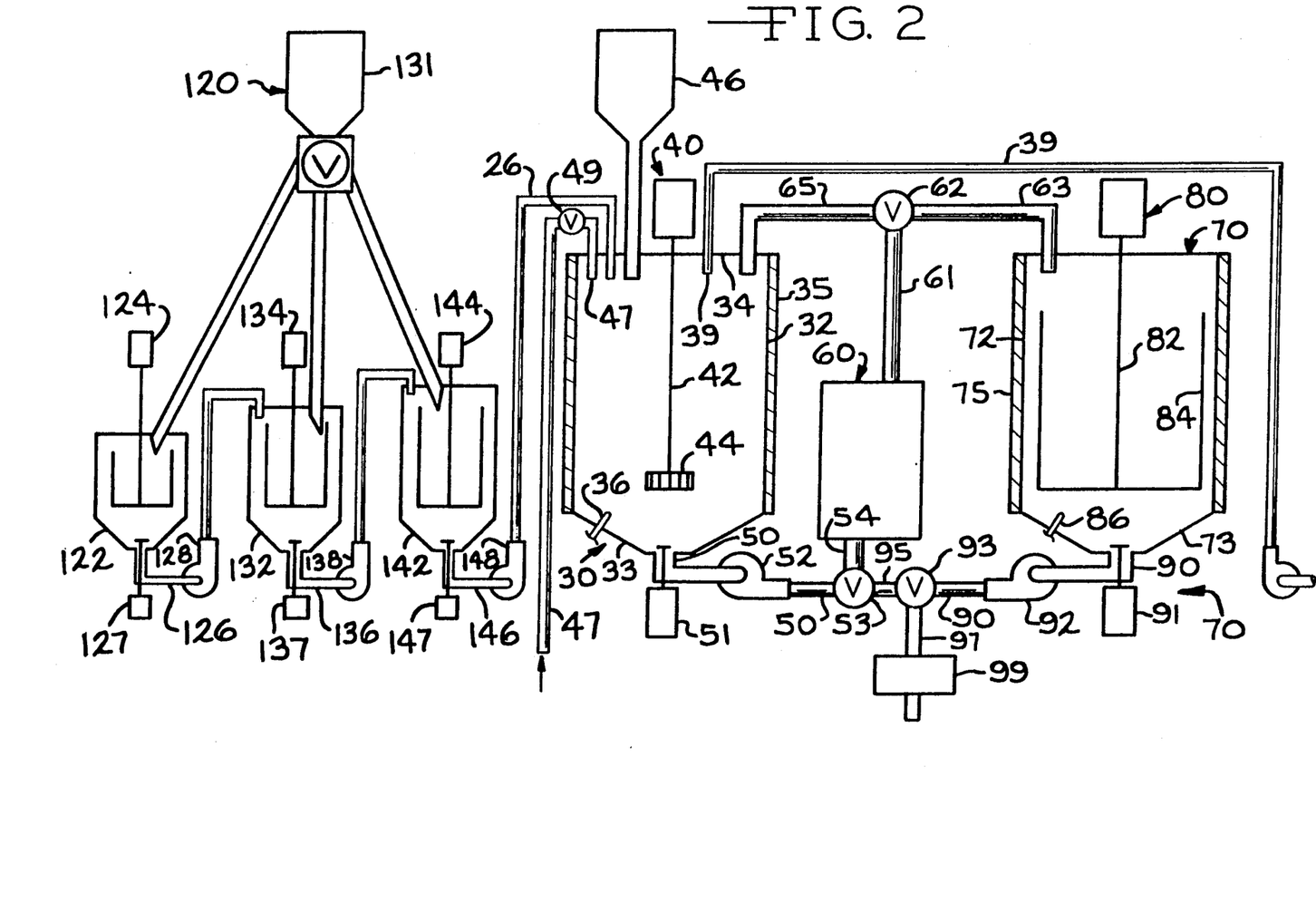
FIG. 2 is a diagrammatic flowchart of an alternative embodiment of the fermentation system of the present invention.

An alternative embodiment of a precursor ingrediator system 120 is shown in FIG. 2 as being attached to the fermentor system 40, heat exchanger 60 and holding tank 70, as described above in detail with reference to FIG. 1. The ingrediator system 120 generally includes a first ingrediator tank 122, an agitator means 124 and an outlet pipe 126 operatively attached to a pneumatic valve 127 and a pump 128. A portion of the precursor ingredients namely, the yeast, a first portion of the water and a first portion of the precursor base are metered or added to the first ingrediator tank 122. The first portion of the precursor base is supplied from a hopper 131 having a valve 133 in a conventional manner. The agitator means 124 blends the ingredients together such that a first portion of the precursor slurry is formed. The first portion of the precursor slurry is allowed to incubate. In a preferred embodiment, the first portion of the precursor slurry is allowed to incubate for approximately 40-45 minutes at a preferred temperature of about 80°-82° F. During the incubation period, the yeast acts as a catalyst and some fermentation occurs. After the first incubation period is complete, the first portion of the precursor slurry is relatively viscous and the agitator means 124 blends the first portion of the precursor slurry (in a preferred process for approximately 1-2 minutes), while the next, or second portion of the water is added to the first ingrediator tank 122. In a preferred embodiment, the water is sprayed into the first ingrediator tank 122 such that the sprayed water acts to clean, or wash down, the side walls of the first ingrediator tank 122. The pneumatic valve 127 is activated and the first portion of the precursor slurry is pumped from the first ingrediator tank 122 through the outlet pipe 126 by the pump 128 to a second ingrediator tank 132.

The second ingrediator tank 132 is operatively connected to an agitator means 134, an outlet pipe 136, a pneumatic valve 137 and a pump 138. The next, or second, portion of the precursor base is metered or added from the hopper 131 to the first portion of the precursor slurry in the second ingrediator tank 132 are blended by the agitator means 134 (in a preferred process for approximately 2-3 minutes). The second portion of the precursor base acts to revitalize the first portion of the precursor slurry. The second portion of the precursor slurry is allowed to incubate. In a preferred process, the second portion of the precursor slurry is allowed to incubate for approximately 40-45 minutes at a preferred temperature of about 80°-82° F. After the second incubation period is complete, the second portion of the precursor slurry is again relatively viscous and the agitator means 134 blends the second portion of the precursor slurry (in a preferred process for approximately 2-3 minutes), while the last or third portion of the water is added to the second ingrediator tank 132. Again, in a preferred embodiment, the water is sprayed into the second ingrediator tank 132 such that the sprayed water acts to clean or wash down the side walls of the ingrediator tank 132. The pneumatic valve 137 is activated and the second portion of the precursor slurry is pumped from the second ingrediator tank 132 through the outlet pipe 136 by the pump 138 to a third ingrediator tank 142.

The third ingrediator tank 142 is operatively connected to an agitator means 144, an outlet pipe 146 a pneumatic valve 147 and a pump 148. Thereafter the last or third, portion of the precursor base is metered from the hopper 131 to the precursor slurry in the third ingrediator tank 142. The precursor slurry and the last portion of the precursor base are blended by the agitator means 144 (in a preferred process for approximately 2-3 minutes). The last portion of the precursor base also acts to revitalize the resulting precursor slurry or active ferment concentrate. The precursor slurry is then allowed to further incubate. In a preferred process, the precursor slurry is allowed to incubate for approximately 40-45 minutes at a preferred temperature of about 80°-82° F. After incubation in the third ingrediator tank 142 is complete, additional water is added to the third ingrediator tank 142. Again, in a preferred embodiment, water is sprayed into the ingrediator tank 142 such that the sprayed water acts to clean or wash down the side walls of the ingrediator tank 142. Thus, the precursor slurry, upon being pumped from the ingrediator tank 142 into the fermentor system 30, has a relatively low viscosity. Thereafter, the pneumatic valve 147 is activated and the precursor slurry is pumped from the third ingrediator tank 142 through the outlet pipe 146 by a pump 148 to the fermentor system 30. According to the present invention once the fermentation process has been started, the tanks 122, 132 and 142 can be filled every hour and the precursor base can be dispensed from the hopper 131 into all three tanks at about the same time.

In a preferred embodiment the ingrediator tank 22, as shown in FIG. 1, is a relatively tall and narrow tank in order to accommodate the separate portions of the precursor slurry being incubated therein. In another preferred embodiment the agitator tanks 122, 132 and 142, as shown in FIG. 2, vary in dimensions. Size requirements varies with given production requirements.

The precursor slurry or active ferment concentrate disclosed herein is especially useful with the above-described fermentation method and apparatus. The active ferment concentrate provides the necessary quality factors for producing a quality end-product. These factors include eating qualities such as flavor, aroma and crumb structure along with the overall appearance qualities of volume symmetry, interior and exterior colors of the product, texture and desired softness and the shelf life qualities. It is necessary that the active ferment concentrate produce the desired pH in the end-product.

The active ferment concentrate, as discussed above, comprises predetermined quantities of yeast, water and precursor base. The precursor base comprises the following ingredients: an acidic concentrate, at least one type of sugar, yeast, at least one type of flour, non-fat dry milk, and at least one type of lactic acid producing bacteria. The ingredients in the precursor base all contribute to the desirable properties of the bakery end-products. In a preferred embodiment, the pH range of the precursor base ranges from about 4.5-5.5 and is most preferably within the range of about 4.9-5.1.

The acidic concentrate provides a supply of ascorbic acid and flavoring and acts as a natural oxidant. In a most preferred embodiment, the acidic concentrate comprises a lemon concentrate which comprises about 60% solids, by weight, and about 40%, by weight, water. The lemon concentrate is commercially available as a frozen product.

The sugar provides substrates and contributes to the general flavor development of the end-product. Sugars which are especially useful in making the precursor base include malt syrup, molasses, sucrose and dextrose. In a preferred embodiment a desired balance is achieved between the amounts of molasses, malt syrup, sucrose and dextrose in order to achieve proper carmelization, or colorization, of the bakery end-product.

The yeast is a good contributor of protein and has desirable flavor characteristics. The yeast metabolizes with the other ingredients in the active ferment concentrate and also provides desirable flavor characteristics to the end-product. In a preferred embodiment the yeast comprises a commercially available inactive dry yeast.

The flour acts as a carrier and a support to the precursor base and to the and dough product. In a preferred embodiment more than one type of flour is used in preparing the precursor base. For example, it is preferred that one of the flours comprise wheat flour and the other flour comprise rye flour. In a preferred embodiment, when the rye flour is used in the precursor base the rye flour potentiates the flavor and aroma characteristics of the bakery end-product and influences some of the acid developments which occur during the incubation and fermentation stages. It is also preferred that other, smaller quantities of flour, such as soya flour and potato flour constitute a portion of the total flour used in the precursor base. The soya flour is a good source of protein. The potato flour also acts as a starch and a stabilizing material. The potato flour acts as a humectant, that is an anticaking material, which absorbs excess moisture from the precursor base. Further, the addition of potato flour aids in prolonging the shelf-life of the bakery end-product. It should be noted that while the concentration of rye flour to wheat flour in the precursor base may be relatively high in proportion to the remaining ingredients in the active ferment concentrate, the rye flour is present in negligible quantities in the final bread product.

The non-fat dry milk provides mineral and protein content to the precursor base. The milk, along with the lactic acid producing bacteria, becomes active by producing lactic acid during the preparation of the active ferment concentrate, as will be explained in detail below, and during the incubation stages of the precursor slurry.

The lactic acid producing bacteria, along with the non-fat dry milk, produces lactic acid. Any lactic acid producing bacteria can be utilized in the present invention including for example, *lactobacillus acidophilus, l. brevis, l. buchneri, l. bulgaricus, l. casei, l. delbrueckii, l. fermenti, l. lactis, l. leichmannii, l. pastoriamus, l. pentoaceticus, l. thermophilus, streptococcus citrovorus,* and *s. lactis,* or a mixture thereof. A preferred bacteria comprises *lactobacillus acidophilus.*

In the preparation of the precursor base for the active ferment concentrate, a liquid composition or slurry is formed by combining the acidic concentrate with a portion of the total sugar to be used in making the precursor base. In a preferred embodiment, the liquid slurry has a temperature in the range of about 60°-65° F. and has sufficient liquidity without becoming warm.

In a separate step, the lactic acid producing bacteria, which is commercially available as a freeze dried product, is diluted with a small amount of flour. The dilution is preferably made to about $10^8$ organisms per gram.

In another separate step the other ingredients, namely the remaining portions of sugar and flour, the non-fat dry milk, the flour-bacteria dilute and the yeast are combined and thoroughly blended together. During this blending step, the liquid slurry is added to the combined ingredients. In a preferred embodiment the liquid slurry is sprayed into the combined ingredients being blended together.

If necessary, in order to rid the precursor base of any lumps, the precursor base may be run through a multiple sifting device or through a mill. It is desirable that any lumps be broken apart since the lumps present are mostly comprised of sugar and acidic concentrate and such lumps lead to deterioration and shorten the shelf life of the precursor base. When the precursor base is well blended and relatively small or no lumps are present, the precursor base is extremely stable. In addition, when the precursor base is utilized for producing the active ferment concentrate (or precursor slurry), as described above, the desired proportions of normal fermentation by-products are developed, thus producing high quality end-products. Thus, the precursor base constitutes approximately 1.0-1.5 percent, by weight, based on the total flour in the dough. The active ferment concentrate (or precursor slurry) constitutes about 2-3 percent, by weight, of the total flour in the dough. The precursor base can be stored in the same manner as flour in bags is typically stored and has a shelf life of at least 6 months.

In a preferred embodiment the precursor base comprises the following ingredients in the following approximate ranges, by weight percent, of the total precursor base:

| acidic concentrate | 1.2-2.0 wt. % |
|---|---|
| sugar | 5.0-20.0 wt. % |
| yeast | 0.5-1.5 wt. % |
| flour | 65.0-85.0 wt. % |
| non-fat dry milk | 4.0-8.0 wt. % |
| lactic bacteria | approximately $5^5 \times 15^5$ organisms/grams |

In an especially preferred embodiment the precursor base ingredients are present in the following weight percentages:

| acidic concentrate | 1.6 wt. % |
|---|---|
| sugar | 13.3 wt. % |
| yeast | 1.0 wt. % |
| flour | 78.1 wt. % |
| non-fat dry milk | 6.0 wt. % |
| lactic bacteria | approximately $10^5$ organisms/grams |

In a preferred process for preparing the precursor base, the acidic concentrate is blended together with about 15%, by weight of the total amount of the sugar present in the precursor base in order to form the liquid slurry. In a preferred embodiment, the amount of sugar in the liquid slurry comprises about 1-3%, by weight, and most preferably about 2.0%, by weight, of the precursor base. In a most preferred embodiment, the sugar in the liquid slurry comprises malt syrup.

The sugar ingredients in a preferred embodiment comprise about 1-3%, by weight, malt syrup and most preferably about 2%, by weight; about 1-2%, by weight, molasses and most preferably about 1.8%, by weight, wherein the molasses if in liquid form can be sprayed onto the remaining ingredients or if in dry form added with the other sugars; about 5.0–10.0%, by weight, sucrose and most preferably about 7.5%, by weight; and, about 0–4.0%, by weight, dextrose, and most preferably about 2.0%, by weight.

The flour ingredients in a preferred embodiment comprise about 35–45%, by weight, wheat flour and most preferably about 42.5%, by weight; about 25–35%, by weight, rye flour and most preferably about 30.0%, by weight; about 2.5–3.0%, by weight, potato flour and most preferably about 2,8%, by weight; and, about 2.5–3.0%, by weight, soya flour and preferably about 2.8%, by weight.

In an alternative embodiment of producing the precursor base, if no sprayer is available, the liquid slurry comprising the acidic concentrate and a first portion of the sugar (in a preferred embodiment, the malt syrup) are blended together to form the liquid slurry and thereafter the remaining portion of sugar is blended together with the liquid slurry. Thereafter, the yeast and first portion of the flour (in a preferred embodiment, the soya flour) is gradually mixed in until blended. Thereafter, a second portion of the flour (in a preferred embodiment the second portion comprises rye and wheat flour) are gradually mixed in until blended. Thereafter, a third portion of flour (in a most preferred embodiment, the potato flour) is gradually mixed in until blended. Thereafter, the non-fat dry milk and the lactic acid producing bacteria diluted with a fourth portion of the flour are gradually mixed until blended together to form the precursor base.

The above detailed description of the present invention is given for explanatory purposes. It will be apparent to those skilled in the art that numerous other changes and modifications can be made in the preferred embodiments of the invention described above without departing from the scope of the invention. Accordingly the whole of the foregoing description is to be construed in an illustrative and not a limitative sense, the scope of the invention being defined solely by the appended claims.

I claim:

1. A process for preparing a precursor base for use in a bakery product dough comprising an acidic concentrate; at least two portions of at least one sugar, yeast, at least two portions of at least one flour, non-fat milk solids, and at least one lactic acid producing bacteria comprising:
    combining the acidic concentrate with a first portion of the sugar to form a liquid slurry;
    diluting the lactic acid producing bacteria with a first portion of the flour to form a flour-bacteria delute;
    combining the remaining portion of flour, the remaining portion of sugar, the non-fat dry milk, the flour-bacteria dilute and the yeast to form a first mixture;
    blending together the first mixture; and
    adding the liquid slurry to the first mixture being blended together.

2. The process of claim 1, in which the liquid slurry is sprayed into the first mixture being blended together.

3. The process of claim 1, in which the first portion of the sugar comprises, by weight percent, based on the total weight of the precursor base, about 1–3 wt. %.

4. The process of claim 3, in which the first portion of sugar comprises malt syrup.

5. The process of claim 4 in which the malt syrup is present in the amount of about 2 wt. %, based on the total weight of the precursor base.

6. The process of claim 1, in which the remaining portion of sugar comprises sucrose, dextrose and molasses.

7. The process of claim 6, in which the remaining portion of sugar comprises, by weight percent, based on the total weight of the precursor base: about 5–10 wt. % sucrose; about 0–4 wt. % dextrose and about 1–2 wt. % molasses.

8. The process of claim 7, in which sucrose is present in the amount of about 7.5 wt. %; dextrose is present in the amount of about 2.0 wt. %; and molasses is present in the amount 1.8 wt. %.

9. The process of claim 1, in which the flour comprises, by weight percent based on the total weight of the total precursor base: about 35–45 wt. % wheat flour; about 25–35 wt. % rye flour; about 2.5–3.0 wt. % potato flour; and about 2.5–3.0 wt. % soya flour.

10. The process of claim 9, in which the wheat flour is present in the amount of about 42.5 wt %; rye flour is present in the amount of about 30 wt. %; potato flour is present in the amount of about 2.8 wt%; and soys flour is present in the amount of about 2.8 wt. %.

11. The process of claim 1, in which the non-fat milk solids comprises, by weight percent, based on the total weight of the precursor base, about 4–8 wt. %.

12. The process of claim 11, in which the non-fat milk solids is present in the amount of about 6.0 wt. %.

13. The process of claim 1, in which the lactic acid producing bacteria is selected from the group including *Lactobacillus acidophilus, L. brevis, L. buchneri, L. bulgaricus, L. casei, L. delbrueckii, L. fermenti, L. lactis, L. leichmannii, L. pastoriamus, L. pentoaceticus, L. thermophilus, Streptococcus citrovorus,* and *S. lactis*, or a mixture thereof.

14. The process of claim 13, in which the lactic acid producing bacteria comprises *Lactobacillus acidophilus*.

15. The process of claim 1, in which the acidic concentrate comprises a lemon concentrate.

16. The process of claim 10, in which the acidic concentrate comprises, by weight percent, based on the total weight of the precursor base, about 1.2–2.0 wt. %.

17. The process of claim 16, in which the acidic concentrate is present in the amount of about 1.6 wt. %.

18. The process of claim 1, in which the yeast is inactive yeast and comprises, by weight percent, based on the total weight of the precursor base, about 0.5–1.5 wt. %.

19. The process of claim 18, in which the inactive yeast is present in the amount of about 1.0 wt. %.

20. A process of producing a precursor base for use in a bakery product dough comprising an acidic concentrate, at least two portions of at least one sugar, yeast, at least two portions of at least one flour, non-fat milk solids, and at least one lactic acid producing bacteria, comprising:
    combining the acidic concentrate and a first portion of the sugar to form a liquid slurry;
    adding the remaining portion of the sugar to the liquid slurry and blending together to form a first mixture;
    blending together the yeast and a first portion of the flour, and thereafter adding the yeast flour blend so formed to the first mixture;

adding to the first mixture and mixing together a second portion of the flour to form a second mixture;

adding to the second mixture and mixing together a third portion of the flour to form a third mixture; and adding to the third mixture and mixing together the non-fat milk solids and lactic acid producing bacteria diluted with a fourth portion of the flour.

21. The process of claim 20, in which the first portion of sugar comprises malt syrup and the remaining portion of sugar comprises sucrose, dextrose, and molasses.

22. The process of claim 21, in which the malt syrup comprises about 1-3 wt. %, based on the total weight of the precursor base.

23. The process of claim 22, in which the malt syrup is present in the amount of about 2 wt. %.

24. The process of claim 21, in which the remaining portion of sugar comprises about 5-10 wt. % sucrose; 0-4 wt. % dextrose; and about 1-2 wt. % molasses, based on the total weight of the precursor base.

25. The process of claim 24, in which sucrose is present in the amount of about 7.5 wt. %; dextrose is present in the amount of about 2 wt. %; and molasses is present in the amount of 1.8 wt. %.

26. The process of claim 20, in which the first portion of flour comprises soya flour.

27. The process of claim 26, in which the soya flour comprises about 2.5-3.0 wt. %, based on the total weight of the precursor base.

28. The process of claim 27, in which the soya flour is present in the amount of about 2.8 wt. %.

29. The process of claim 20, in which the second portion of flour comprises rye flour and wheat flour.

30. The process of claim 29, in which the wheat flour comprises about 35-45 wt. %; and rye flour comprises about 25-35 wt. %, based on the total weight of the precursor base.

31. The process of claim 30, in which the wheat flour is present in the amount of about 42.5 wt. % and rye flour is present in the amount of about 30 wt. %.

32. The process of claim 20, in which the third portion of flour comprises potato flour.

33. The process of claim 32, in which the potato flour comprises about 2.5-3.0 wt. %, based on the total weight of the precursor base.

34. The process of claim 33, in which the potato flour is present in the amount of about 2.8 wt. %.

35. The process of claim 20, in which the non-fat milk solids comprises about 4.0-8.0 wt. %, based on the total weight of the precursor base.

36. The process of claim 35, in which the non-fat milk solids is present in the amount of about 6 wt. %.

37. The process of claim 20, in which the lactic acid producing bacteria is selected from the group including:
*Lactobacillus acidophilus;*
*L. brevis;*
*L. buchneri;*
*L. bulgaricus;*
*L. casei;*
*L. delbrueckii;*
*L. fermenti;*
*L. lactis;*
*L. eichmannii;*
*L. pastoriamus;*
*L. pentoaceticus;*
*L. thermophilus;*
*Streptococcus citrovorus;* and
*S. lactis;* or
a mixture thereof.

38. The process of claim 20, in which the lactic acid producing bacteria includes at least *Lactobacillus acidophilus.*

39. The process of claim 20, in which the acidic concentrate comprises a lemon concentrate.

40. The process of claim 39, in which the acidic concentrate comprises, by weight percent, based on the total weight of the precursor base, about 1.2-2.0 wt. %.

41. The process of claim 40, in which the acidic concentrate is present in the amount of about 1.6 wt. %.

42. The process of claim 20, in which the yeast is inactive yeast and comprises, by weight percent, based on the total weight of the precursor base, about 0.5-1.5 wt. %.

43. The process of claim 20, in which the yeast is present in the amount of about 1.0 wt. %.

44. An active ferment concentrate comprising the precursor base of claim 20, catalytic-acting yeast and water.

45. The active ferment concentrate of claim 44 comprising approximately 50% water and approximately 2% catalytic-acting yeast, by weight, based on the total weight of the active ferment concentrate.

46. A process for producing an active ferment concentrate for use in producing a preferment dough mixture for the preparation of a bakery dough product comprising:
forming a precursor base by mixing together:
an acidic concentrate;
at least one sugar;
yeast;
at least one flour;
non-fat milk solids; and
at least one lactic acid producing bacteria;
combining and blending together yeast, water and a first portion of the precursor base to form a first mixture;
incubating the first mixture;
agitating the incubated first mixture;
adding and blending together and precursor base to the incubated first mixture to form a second mixture;
incubating the second mixture;
agitating the incubated second mixture;
adding and blending together water and precursor base to the incubated second mixture and to form a third mixture;
incubating the third mixture to produce the active ferment concentrate.

47. The process of claim 46, in which the first mixture is incubated at a temperature of about 80°-82° F. for approximately 40-45 minutes.

48. The process of claim 46, in which the incubated first mixture is agitated for approximately 1-2 minutes.

49. The process of claim 46, in which the second mixture is blended for approximately 2-3 minuets.

50. The process of claim 46, in which the second mixture is incubated at a temperature of about 80°-82° F. for approximately 40 minutes.

51. The process of claim 46, in which the incubated second mixture is agitated for approximately 2-3 minutes.

52. The process of claim 46, in which the third mixture is blended for approximately 2-3 minutes.

53. The process of claim 46, in which the third mixture is incubated at a temperature of about 80°-82° F. for approximately 40 minutes.

54. The process of claim 46, in which approximately one-third of the total water necessary to form the active ferment concentrate is added at a time.

55. The process of claim 46, in which approximately one-third of the total precursor base necessary to form the active ferment concentrate is added at a time.

56. The process of claim 46 further comprising:
combining the active ferment concentrate, a predetermined amount of water, a predetermined amount of flour, a predetermined amount of yeast, and optionally, yeast nutrients together; and
allowing the combined ingredients to ferment to form preferment dough mixture.

57. The process of claim 56, in which the combined active ferment concentrate, predetermined amount of water, predetermined amount of flour, predetermined amount of yeast, and optionally, yeast nutrients are allowed to ferment at a temperature of about 80°-82° F. for approximately 30 minutes.

58. The process of claim 56, in which the preferment dough mixture comprises approximately 15% flour, by weight, based on the total weight of the bakery dough product into which it is formed.

59. The process of claim 56, including cooling the preferment dough mixture to a predetermined temperature and thereafter adding a final predetermined amount of flour to form a bakery dough product.

60. The process of claim 59, including cooling and storing the preferment dough mixture for a period of time before mixing it with the final predetermined amount of flour to form the bakery dough product.

61. The process of claim 60, in which the cooling of the preferment dough mixture is repeated in order to maintain the temperature of the preferment dough mixture between predetermined upper and lower limits.

62. The process of claim 46 wherein the precursor base consists essentially of by weight percent, based on the total weight of the precursor base, approximately:

| acidic concentrate | 1.6 wt. %; |
| sugar | 13.3 wt. %; |
| inactive yeast | 1.0 wt. %; |
| flour | 78.1 wt. %; |
| non-fat milk solids | 6.0 wt. %; and |
| lactic bacteria | approximately $10^5$ organisms/gram. |

63. The process of claim 46 wherein the acidic concentrate comprises a lemon concentrate.

64. The process of claim 63 wherein the lemon concentrate comprises about 60% total solids therein.

65. The process of claim 46 wherein the sugar is selected from the group comprising malt, syrup, molasses, sucrose and dextrose, or a mixture thereof.

66. The process of claim 46 wherein the sugar comprises, by weight percent based on the total weight of the precursor base, about 1-3 wt. % malt syrup, 1-2 wt. % molasses, 5-10 wt. % sucrose and about 0-4 wt. % dextrose.

67. The process of claim 66 wherein the sugar comprises, by weight percent based on the total weight of the precursor base, about 2 wt. % malt syrup, 1.8 wt. % molasses, 7.5 wt. % sucrose and about 2 wt. % dextrose.

68. The process of claim 46 wherein the flour is selected from the group comprising wheat flour, rye flour, soya flour and potato flour, or a mixture thereof.

69. The process of claim 46 wherein the flour comprises, by weight percent based on the total weight of the precursor base, about: 35-45 wt. % wheat flour; 25-35 wt. % rye flour; 2.5-3 wt. % potato flour; and 2.5-3 wt % soya flour.

70. The process of claim 69 wherein the flour comprises by weight percent about 42.5 wt. % wheat flour; 30.0 wt. % rye flour; 2.8 wt. % potato flour, and 2.8 wt. % soya flour.

71. The process of claim 46 wherein the lactic acid producing bacteria is selected from the group including: *Lactobacillus acidophilus, L. brevis, L. buchneri, L. bulgaricus, L. casei, L. delbrueckii, L. fermenti, L. lactis, L. Leichmannii, L. pastoriamus, L. pentoaceticus, L. thermophilus, Streptococcus citrovorus,* and *S. lactis,* or a mixture thereof.

72. The process of claim 46 wherein the lactic acid producing bacteria comprises *lactobacillus acidophilus.*

73. A bakery product made by commencing baking the bakery dough product constructed by the process of claim 59 less than one hour after the addition of the final predetermined amount of flour to form the bakery dough product.

* * * * *